United States Patent [19]
Feuer

[11] Patent Number: 6,078,597
[45] Date of Patent: Jun. 20, 2000

[54] METHOD AND APPARATUS FOR OPTICAL SIGNAL PROCESSING BY PHOTO-INDUCED LOSS AND/OR GAIN GRATINGS

[75] Inventor: Mark D. Feuer, Colts Neck, N.J.

[73] Assignee: AT & T Corp., New York, N.Y.

[21] Appl. No.: 08/752,332

[22] Filed: Nov. 19, 1996

[51] Int. Cl.$^7$ .................................................. H01S 3/30
[52] U.S. Cl. .................... 372/6; 372/11; 372/96
[58] Field of Search .................. 372/6, 11, 96; 359/568; 385/10, 37

[56] References Cited

U.S. PATENT DOCUMENTS

| | | | |
|---|---|---|---|
| 5,283,686 | 2/1994 | Huber | 359/337 |
| 5,305,402 | 4/1994 | Hill et al. | 385/25 |
| 5,311,606 | 5/1994 | Asakura et al. | 385/33 |
| 5,337,382 | 8/1994 | Mizrahi | 385/37 |
| 5,416,866 | 5/1995 | Sahlen | 385/37 |
| 5,627,848 | 5/1997 | Fermann et al. | 372/6 |

FOREIGN PATENT DOCUMENTS

WO 9532451 11/1995 WIPO.

OTHER PUBLICATIONS

"Transient Bragg Reflection Gratings in Erbium–Doped Fiber Amplifiers", by S. J. Frisken, Optics Letters, Dec. 15, 1992, USA, vol. 17, o. 24, pp. 1776–1778, XP000334834 (from the European Search Report regarding European Patent Application No. EP 97 11 9620).

"Channel Power Equalising WDM Link Incorporating Twincore Erbium Doped Fibre Amplifiers", by O. Graydon, et al., OSa Trends in Optics and Photonics, vol. 5—Optical Amplifiers and their Applications Proceedings of the Topical Meeting , OSA Tops vol. 5 Jul. 11–13 1996, pp. 91–93 XP002085892 (from the European Search Report regarding European Patent Application No. EP 97 11 9620).

Frisken, S. J., "Transient Bragg reflection gratings in erbium–doped fiber amplifiers," Optics Letters, vol. 17, No. 24, Dec. 15, 1992, pp. 1776–1778.

Fischer, B., "Nonlinear wave mixing and induced gratings in erbium–doped fiber amplifiers," Optics Letters, vol. 18, No. 24, Dec. 15, 1993, pp. 2108–2110.

Fischer, B. et al., "Nonlinear four–wave mixing in erbium–doped fiber amplifiers," Elect. Letts., vol. 29, No. 21, Oct. 14, 1993, pp. 1858–1859.

Loh, W. H. et al., "Single frequency erbium fiber external cavity semiconductor laser," Appl. Phys. Lett., vol. 66, No. 25, Jun. 19, 1995, pp. 3422–3424.

Graydon, O. et al., "Channel power equalising WDM link incorporating twincore erbium doped fiber amplifiers," Optical Amplifiers and Their Applications, Jul. 11–13, 1996, Monterey, California, FB5–Jan. 1989 to FB5–Apr. 1992.

Primary Examiner—Rodney Bovernick
Assistant Examiner—Robert E. Wise

[57] ABSTRACT

A method and apparatus for inducing a loss or gain grating in a saturable medium, and the application of this induced grating to provide optical signal processing functions to a lightwave communications signal. The method and apparatus provides self-tuning noise filtering and self-adjusting channel equalization of lightwave communication signals using a single-mode guided wave structure including a saturable medium, the medium having a first and second end, a reflector at the first end of the medium, and an input/output port at the second end of the medium such that light entering the input port interferes with light reflected off said reflector to create an interference induced grating.

31 Claims, 9 Drawing Sheets

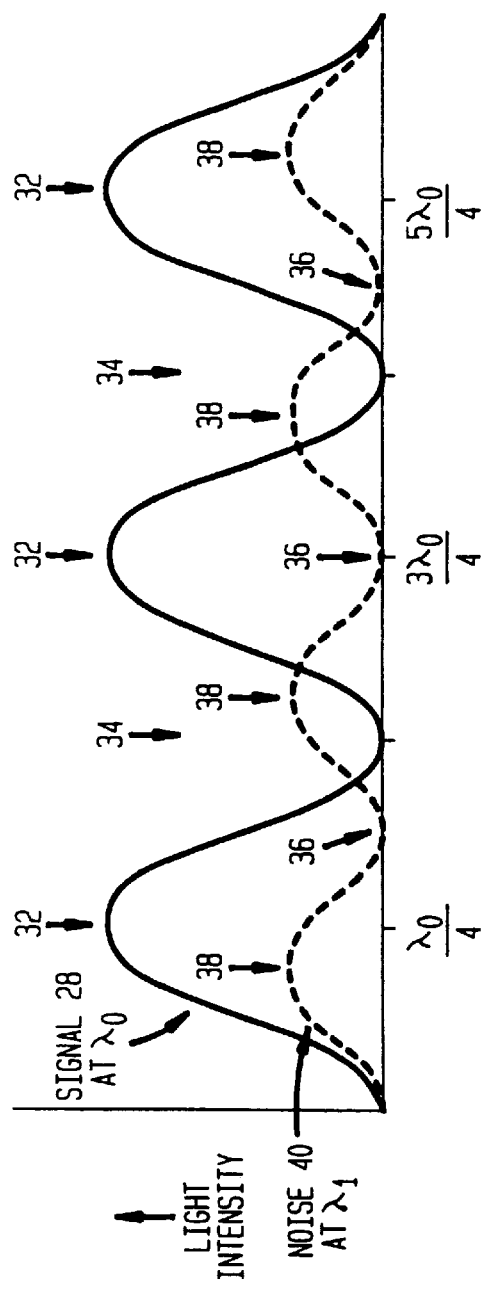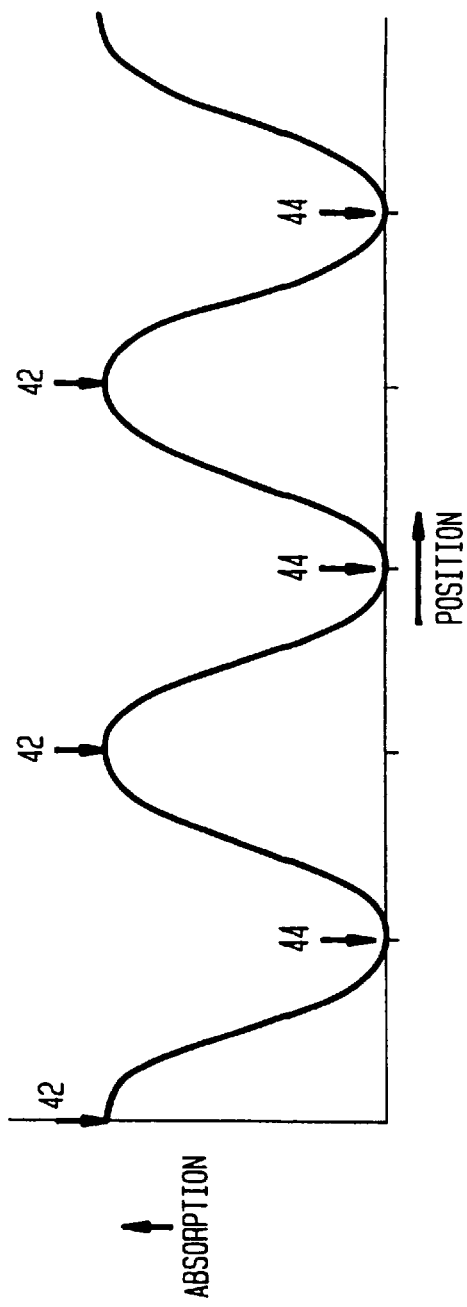

METHOD AND APPARATUS FOR OPTICAL SIGNAL PROCESSING BY PHOTO-INDUCED LOSS AND/OR GAIN GRATINGS

FIELD OF THE INVENTION

The present invention relates to optical signal processing. More particularly, the present invention relates to the use of multiple-beam optical interference to induce a loss or gain grating in a saturable medium, and the application of this induced grating to provide optical signal processing functions to a lightwave communication signal.

BACKGROUND OF THE INVENTION

In all forms of lightwave communications systems, noise from a variety of causes can interfere with the users' communications. Examples of corrupting noise include noise originating as part of the transmitted signal, noise created in the process of digital encoding and signal formatting, noise introduced by crosstalk in couplers or reflections in optical components, noise caused by the distortion of the signal or creation of unwanted harmonic products due to nonlinearities at the transmitter or receiver, quantum or modal noise within the optical source, and so forth.

The presence of noise in lightwave communications systems is annoying or distracting to users, can adversely affect speech quality, can reduce the performance of speech coding and speech recognition apparatus, and in some instances completely render the optical information signal unintelligible to the system and thus the user. As a consequence, there exists a need to filter such noise from an optical information signal.

Lightwave communications systems involving optical amplifiers have a particular problem with amplified spontaneous emission (ASE) noise. ASE noise arises in the amplification process. The resonant medium that provides amplification by the process of stimulated emission also generates spontaneous emission. The light arising from spontaneous emission is independent of the input to the amplifier, and represents a fundamental source of amplifier noise. Whereas the amplified signal has a specific frequency, direction, and polarization, the ASE noise is broadband, multidirectional, and unpolarized. As a consequence it is possible to filter out some of this noise by following the amplifier with a narrow bandpass optical filter.

Fixed optical filters such as multilayer dielectric coatings can be used to filter out ASE noise. Properties of such fixed optical filters are discussed, for example, in a book edited by Walter G. Driscoll and William Vaughn, titled *Handbook of Optics*, Chapter 8, Mcgraw-Hill, New York, 1978.

There are many problems, however, associated with the use of fixed optical filters. For example, fixed optical filters require precise wavelength matching of the filter and the lightwave signal. This requirement increases the cost of the filter and the entire system. Furthermore, light sources are susceptible to aging, leading to a mismatch of the lightwave signal to the fixed filter over time, and necessitating repair or replacement. Fixed filters are also sensitive to environmental changes. Consequently, the environmental conditions surrounding the filter must be carefully controlled and monitored. Environmental changes such as temperature fluctuations can distort the filter wavelength thus requiring repair or replacement. In addition, if the lightwave communications system is upgraded and uses a different or additional wavelength for the transmission signal, the filter must be replaced to match the new wavelength. For those systems using multi-wavelength signals, a filter is required for each wavelength, greatly increasing the initial and replacement costs associated with each filter.

Another type of filter capable of filtering out ASE noise is a refractive-index filter. Examples of refractive-index filters are discussed in "Transient Bragg reflection gratings in erbium-doped fiber amplifiers," by S. J. Frisken, *Optics Letters*, Vol. 17, No. 24, Dec. 15, 1992, and "Nonlinear wave mixing and induced gratings in erbium-doped fiber amplifiers," by Baruch Fischer, *Optics Letters*, Vol. 18, No. 24, Dec. 15, 1993.

Tunable refractive-index filters such as those discussed in Frisken and Fischer induce a refractive-index grating in a doped medium to reflect an optical information signal to an output port while unwanted noise is passed through the filter to be absorbed elsewhere. Refractive-index filters split a control wave using an optical coupler. These filters then direct a beam through each end of a doped medium, such as erbium doped (Er-doped) fiber. Propagating the beams in opposite directions creates a standing wave, which in turn induces a refractive-index grating capable of reflecting certain wavelengths of light. By carefully controlling the refractive-index grating, the wavelengths representing noise can be separated or "filtered" from the signal wave.

These filters, however, are problematic. The refractive-index grating merely re-routes the unwanted noise without absorbing it, so care must be taken to avoid leakage of the noise back into the communication system. In addition, these filters require the use of both a pump light source to produce the gain in the Er-doped fiber, and a tuning-control light source to create the standing wave. This increases the number of required components for filters of this type and greatly increases their cost. Further, the wavelength of the tuning-control source must be precisely matched to that of the signal, requiring a wavelength-locking feedback loop control, adding even greater complexity. Finally, adding a new signal wavelength to increase capacity would require addition of another tuning control source in every filter, making such upgrades prohibitively costly.

Moreover, refractive-index filters split the wave from the tuning-control light source and direct each beam through both ends of the doped medium to induce the refractive-index grating. This necessitates additional optical components such as couplers, loops and polarization controllers. These extra components not only increase the cost of the filter, but also create instability of the standing wave because of the error introduced to the beams as they pass through these additional components. Since loss of coherence between the two beams will destroy the signal output, this instability severely limits the robustness of the system.

In addition to noise, power control is a critical issue in lightwave communications systems. Systems using multiple wavelength channels can suffer severe penalties if the channel power levels vary too widely. Slight wavelength dependence of the optical amplifier gain can lead to such imbalances after an amplifier chain. Therefore, automatic adjustment of channel levels, known as channel equalization, must be performed periodically.

One method of channel equalization is to separate the wavelengths, measure the power of each one, and adjust the gain or loss experienced by each channel before recombining them. Equipment to perform this chanel-by-channel adjustment, however, is expensive and can degrade the signal-to-noise ratio of the channels.

A twincore erbium doped fiber amplifier (TC-EDFA) with a channel equalization of 1 decibel (dB) is discussed in a conference report titled "Channel power equalizing WDM link incorporating twincore erbium doped fibre amplifiers" by Oliver Graydon et al., Summaries of the papers presented at the topical meeting *Optical Amplifiers and Their Applications*, Monterey, Calif., Jul. 11–13, 1996. When multiple channels are launched into one core of a pumped Er-doped twincore fiber, the channel powers couple from core to core along the length of the fiber. This beatlength, however, is wavelength dependent and thus the channels become periodically spatially separated. This decoupling of the channels gives the Er-doped fiber amplifier inhomogeneous saturation characteristics and allows the channels to saturate the gain to some degree independently. As a result weaker channels will receive more gain than stronger channels. This intrinsic equalizing effect keeps the channels propagating with constant powers along the TC-EDFA cascade.

A problem with the Graydon equalizer is that it requires the use of dual-core fiber. Dual-core fiber requires precisely controlled coupling, making the Graydon equalizer difficult to manufacture. Further, it is difficult to eliminate the undesired polarization and wavelength dependence requirements.

Accordingly, it becomes readily apparent there exists a need for a method apparatus for implementing a self-tuning filter and a self-adjusting channel equalizer that is robust and solves the above-discussed problems.

SUMMARY OF THE INVENTION

The present invention relates to a method and apparatus for creating an interference induced grating in a saturable medium, and the application of this induced grating to provide optical signal processing functions to a lightwave communications signal. Two embodiments of the present invention provide self-tuning noise filtering and self-adjusting channel equalization of lightwave communications signals which are valuable in constructing robust, flexible, and less expensive communications systems.

The automatic noise filtering and channel equalization of lightwave communications signals is accomplished by inducing loss or gain gratings, respectively, in a saturable absorption medium. The apparatus discussed in detail below incorporates the saturable medium into a single-mode guided wave structure which has a reflector at one end, and an input/output port at the other end. Light entering the input/output port interferes with light reflected off the reflector to create a standing wave pattern of intensity maxima and minima. This intensity standing wave induces a saturation grating in the saturable medium to provide the desired effects.

With respect to the noise filtering embodiment of the invention, a loss grating is created having areas of low and high absorption along the length of the wave guide medium. These areas of low and high absorption substantially coincide with the intensity maxima and minima, respectively, of the signal wave. Therefore, the signal energy is concentrated in low absorption areas, and the signal wave loses little energy as it passes along the doped medium. Noise waves, however, operate at different wavelengths from the signal wave. Thus, it is extremely likely that some noise wave peaks will occur at regions of high absorption along the length of the medium, thereby attenuating the noise.

The channel equalization embodiment can be constructed using the same apparatus described for the noise filter, with the addition of a source of pump light and a means for introducing the pump light into the saturable medium. The wavelength of the pump light is outside the signal band, and is chosen to provide gain in the medium. As before, a standing wave is generated by the signal light, inducing a gain grating with reduced gain at the intensity maxima. The degree of gain reduction, or saturation, depends on the intensity level, leading to a desirable automatic gain control (AGC) effect.

The present invention provides significant advantages over optical signal processing devices currently used for optical filtering and channel equalization. First, the present invention provides self-tuning filters and self-adjusting channel equalizers, where previous filters and channel equalizers needed external tuning control. Second, because signals enter and exit the doped medium by the same port, the present invention requires fewer optical components. This decreases system costs as well as the introduction of noise or error in the signal. Third, the present invention is not as sensitive to environmental conditions as previous filters and channel equalizers. Fourth, the present invention allows system upgrades without the need to replace the optical filters and channel equalizers (and associated optical components). Fifth, the compact reflector-based structure for generating the standing wave reduces instability and improves robustness. Sixth, the present invention is inherently polarization-independent. Seventh, the present invention can use single-core fiber or planar waveguide which are easier to manufacture than twin-core fiber. Finally, the filter embodiment of the present invention does not require the addition of pump light into the doped medium, and therefore requires fewer optical components. These and other advantages of the present invention solve many problems associated with previous optical signal processing devices.

With these and other objects, advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 2.B is an absorption versus wavelength plotting for spectral hole-burning of a saturable absorber used in accordance with an embodiment of the present invention.

FIG. 2.C is an absorption versus wavelength plotting of a spectral hole typical of common saturable absorbers.

FIG. 4 is a light intensity versus position plotting of an optical information signal and noise wave as an example of the type of signal processed in accordance with an embodiment of the present invention.

FIG. 5 is an absorption versus position along the waveguide plotting showing an example of the type of loss grating created in accordance with an embodiment of the present invention.

DETAILED DESCRIPTION

The invention will be described in connection with a lightwave communications system. The invention is essentially an optical signal processing device and method for creating a gain or loss grating in a single-mode guided wave structure having a saturable medium. Two possible embodiments of this device include an optical filter and channel equalizer. The invention enhances the quality of a received optical information signal and controls the power levels of multiple communications channels.

Figure 1:
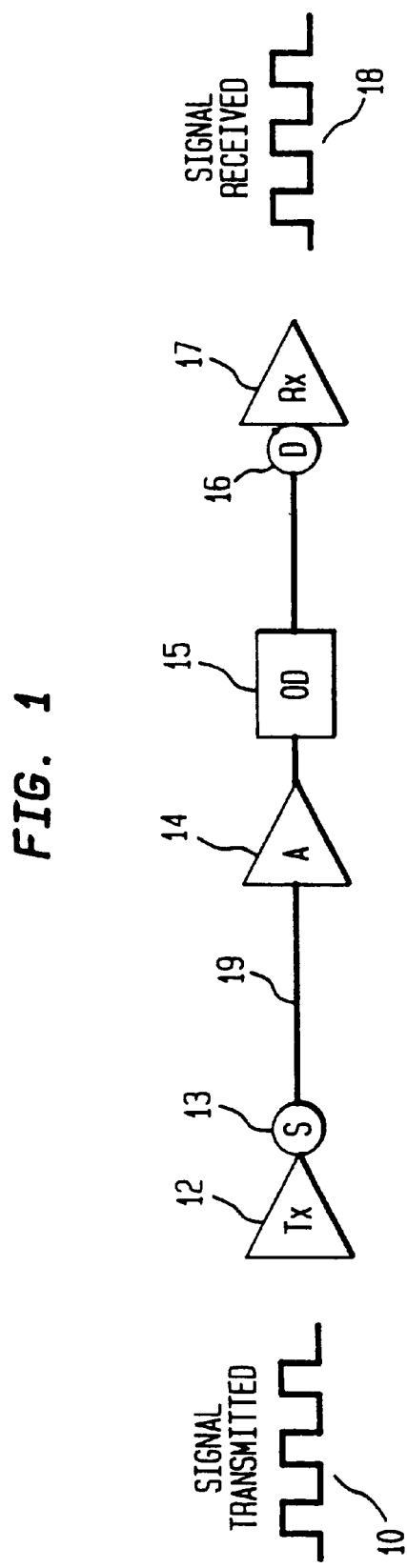
FIG. 1 is a block diagram of a system in which an embodiment of the present invention may be deployed.

Referring now in detail to the drawings wherein like parts are designated by like reference numerals throughout, there is illustrated in FIG. 1 a block diagram of a system in which an embodiment of the present invention may be deployed.

FIG. 1 illustrates an exemplary lightwave communications system, constituting signal transmitted 10 entering optical communications transmitter 12.

Transmitter 12 has optical source driver 13 that converts signal 10 to a drive current that intensity modulates the source. Optical source driver 13 generates the energy that is coupled into transmission medium 19, which is typically optical fiber. The energy propagates down transmission medium 19 and is attenuated to a degree. To compensate for this attenuation, the energy is put into optical amplifier 14 which increases the amplitude of an optical field while maintaining its phase. A byproduct of optical amplification of the energy is the introduction of ASE noise.

To reduce this ASE noise the energy is passed through optical device 15. Optical device 15 may also automatically adjust the gain for each wavelength of a multi-wavelength channel. Although optical device 15 is shown immediately after optical amplifier 14, optical device 15 can be placed in receiver 17, or anywhere in the system where filtering or channel equalization is desired.

After passing through optical device 15, the energy is placed back on transmission medium 19. The energy exits transmission medium 19 at the other end and is coupled into photodetector 16. The light energy that is absorbed in photodetector 16 is converted to a photocurrent. This photocurrent is then amplified in receiver 17 and converted to the proper signal format for signal received 18 at the output.

SELF-TUNING FILTER EMBODIMENT

One embodiment of the present invention comprises a self-tuning optical filter based on spatial hole-burning in a saturable optical medium. One example of a saturable optical medium is Er-doped fiber. Optical filters are important in amplified systems, including soliton-based systems, to control the ASE noise which arises in the amplification process. Since the filter wavelength must closely match the signal wavelength, both signal source and filter must be rigidly controlled and stabilized when fixed filters are used. Much more flexible operation could be achieved if the filter were self-tuning, i.e., able to follow the signal wavelength.

Such a self-tuning filter could be realized by passing the signal light through a saturable absorber, if the absorption of different wavelengths were independent. The suppression of absorption at a particular wavelength is called spectral hole-burning.

Figure 2A:
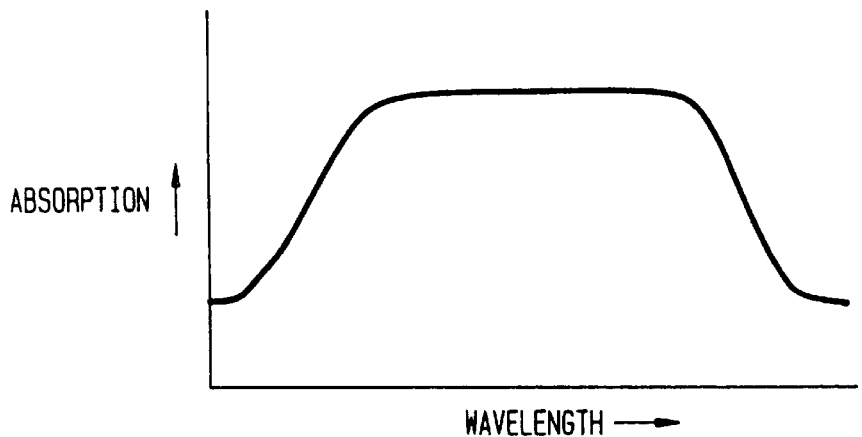
FIG. 2.A is an absorption versus wavelength plotting for a saturable absorber used in accordance with an embodiment of the present invention.
Figure 2B:
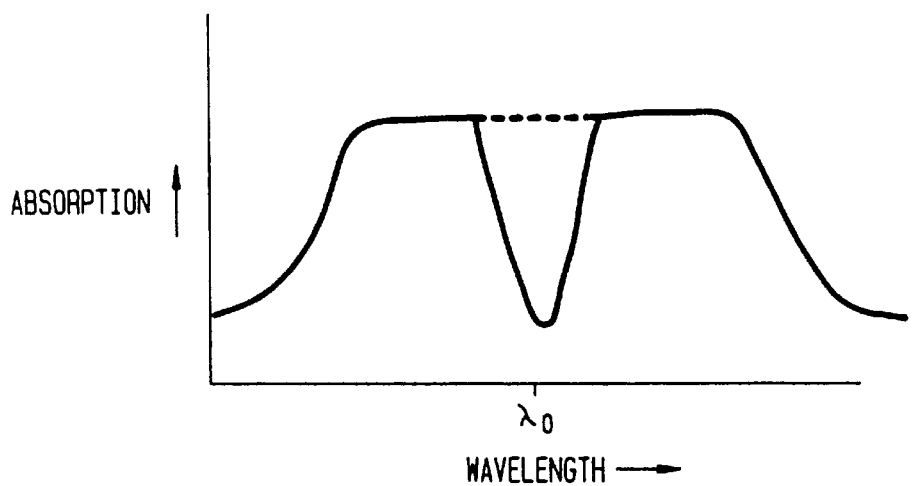
Figure 2C:
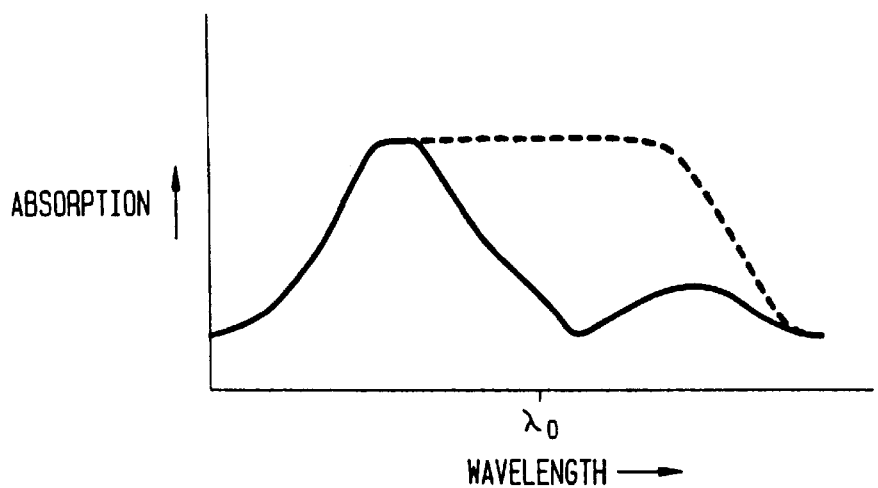

FIG. 2.A is an absorption versus wavelength plotting for a saturable absorber used in accordance with an embodiment of the present invention. FIG. 2.A depicts a saturable absorber with no signal or weak signal. As can be seen by the graph, absorption is high under these circumstances.

FIG. 2.B is an absorption versus wavelength plotting for spectral hole-burning of a saturable absorber used in accordance with an embodiment of the present invention. When a strong signal is passed through a saturable absorber, it creates an area of low-absorption near the signal wavelength, as shown in FIG. 2.B.

FIG. 2.C is an absorption versus wavelength plotting of a spectral hole typical of common saturable absorbers. As shown in FIG. 2.C, the spectral hole in common saturable absorbers is too broad in wavelength to be of practical use.

Accordingly, the present invention uses spatial hole burning, which suppresses absorption at certain locations in the absorber, rather than spectral hole-burning. The wavelength filtering effect is achieved by routing or concentrating different wavelengths of light to different locations in the absorber.

One embodiment of the present invention uses a single-mode guided-wave structure, an example of which is a single-core, Er-doped fiber, with an end reflector to create a standing wave of intensity maxima in the fiber. The standing wave is created by passing an optical signal through a counter-propagating replica of the signal within the single-mode guided-wave structure. The counter-propagating replica of said signal is created using the end reflector to reflect the incoming optical signal back towards itself.

The Er-doped fiber is unpumped (or possibly underpumped) so that it produces loss rather than gain. The loss in this fiber, however, can be suppressed by saturating it with a strong signal. In the two-pass reflection geometry, the strong signal magnitude suppresses absorption only at fixed locations. The locations are separated by distance of (n) times (w) divided by two, where (n) is the refractive index and (w) is the signal wavelength.

Since the signal wave is concentrated at substantially the areas of low absorption, the signal suffers only slight absorption. Noise at another wavelength will be concentrated at a different set of locations, some of which will be areas of high absorption. Thus, the broadband noise will be attenuated much more strongly than the signal, achieving the desired self-tuning filtering effect.

The present invention can also use saturable absorbers other than Er-doped fiber. In particular, the present invention can also use optical waveguides fabricated on planar substrates, such as glass, lithium niobate, or semiconductor substrates. Moreover, the optical waves need not necessarily be guided. For example, back-reflection of plane waves will produce a similar pattern of wavelength dependent intensity maxima.

Figure 3:
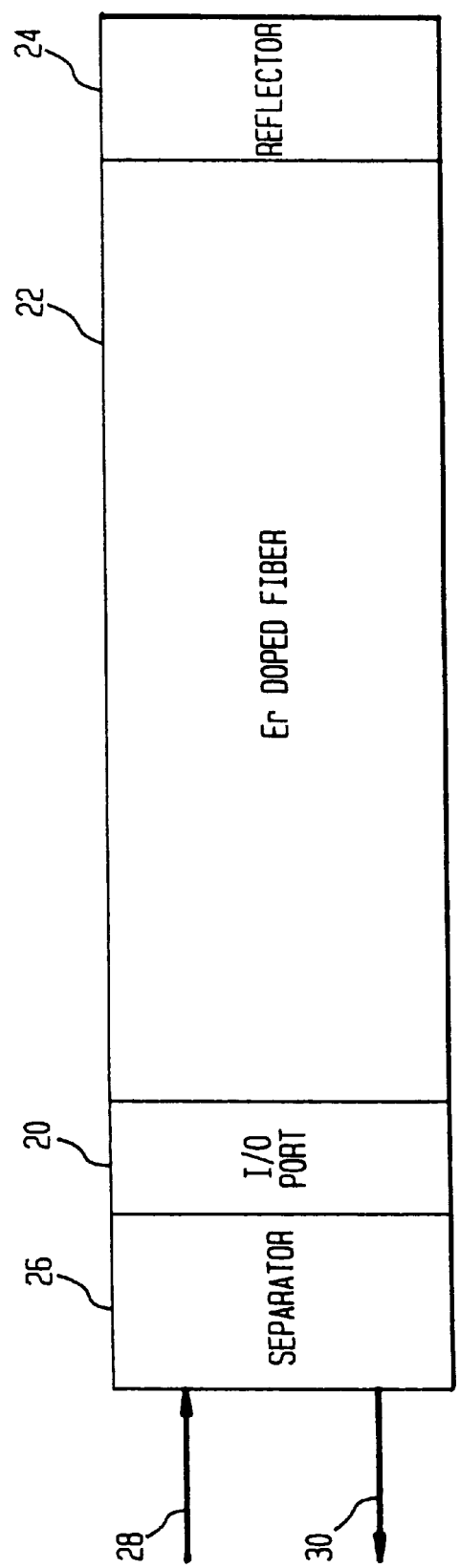
FIG. 3 is a block diagram in accordance with an embodiment of the present invention.

FIG. 3 is a block diagram in accordance with an embodiment of the present invention. Input signal wave 28 is directed into input/output (I/O) port 20 by separator 26. Practical examples of separator 26 include a circulator or 3 dB directional coupler. I/O port 20 transfers input signal wave 28 into saturable absorber. This embodiment of the present invention uses Er-doped fiber 22. Input signal wave 28 propagates along Er-doped fiber 22 until reaching reflector 24. Practical examples of reflector 24 include a metallic mirror or dichroic coating. Reflector 24 reflects input signal wave 28 creating output signal wave 30. Output signal wave 30 propagates away from reflector 24 and runs directly through input signal wave 28. Output signal wave 30 exits the Er-doped fiber through I/O port 20 by separator 26.

When two or more optical waves are present simultaneously in the same region of space, an interference pattern is produced, and the total wavefunction becomes the sum of the individual wavefunctions. This sum of individual wavefunctions forms a waveform referred to as a standing wave. The standing wave caused by input signal wave 28 and output signal wave 30 saturates the absorption of Er-doped fiber 22, creating a periodic array of high-absorption and low-asorption regions along the length of Er-doped fiber 22, which is referred to herein as an interference induced grating. The low-absorption regions substantially coincide with intensity maxima 32 (shown in FIG. 4) of input signal wave 28, so there is relatively little attenuation of output signal wave 30 as it exits I/O port 20 by separator 26.

FIG. 4 is a light intensity versus position plotting of an optical information signal and noise wave as an example of the type of signal processed in accordance with an embodiment of the present invention. The position of the optical information signal and noise wave is measured in terms of wavelengths ($\lambda 0$) from the reflector which is represented by the right axis, with the axis points labeled as $\lambda 0/4$, $3\lambda 0/4$ and $5\lambda 0/4$.

FIG. 5 is an absorption versus position along the waveguide plotting showing an example of the type of loss grating created in accordance with an embodiment of the present invention.

Together, FIG. 4 and FIG. 5 provide a more complete picture of the optical signal processing of an embodiment of the present invention. As displayed in FIGS. 4 and 5, intensity maxima 32 substantially coincides with low-absorption area 44 of the loss grating. Similarly, intensity minima 34 precisely coincides with high-absorption area 42 of the loss grating. As input signal wave 28 passes along the length of Er-doped fiber 22, intensity maxima 32 of input signal wave 28 passes through low-absorption area 44 while intensity minima 34 of input signal wave 28 passes through high-absorption area 42 of the loss grating. Therefore, the energy of output signal wave 30 is relatively undiminished as it passes along the length of fiber 22 to I/O port 20.

Noise wave 40, however, comprises a different wavelength than input signal wave 28. Therefore, the intensity maxima 38 of noise wave 40 will invariably pass through high-absorption area 42, thereby attenuating the energy of noise wave 40. The amount of noise reduction is discussed in the appendix attached hereto, which comprises a quantitative theory of the present noise filter, with numerical results for some cases of interest.

AUTOMATIC AND INDEPENDENT ADJUSTING CHANNEL EQUALIZATION EMBODIMENT

Figure 6:
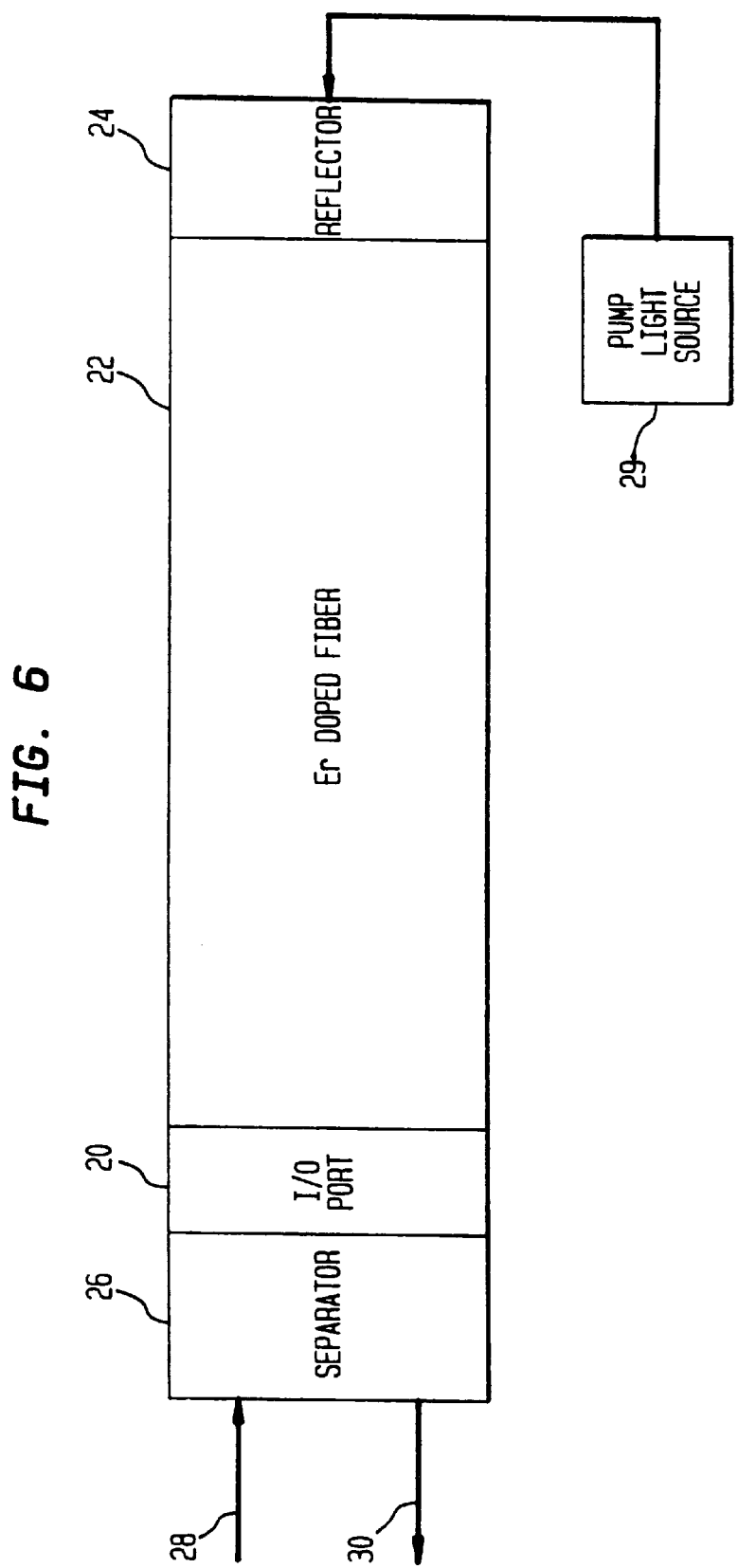
FIG. 6 is a block diagram in accordance with an embodiment of the present invention.

FIG. 6 is a block diagram in accordance with another embodiment of the present invention for automatically and independently adjusting channel equalization. Such channel equalization can be achieved in a fiber-reflector pair similar to that shown in FIG. 3, with the addition of pumping light from light source 29 into Er-doped fiber 22 to produce gain in Er-doped fiber 22. The pump light is introduced into Er-doped fiber 22 through end reflector 24, which can be made of dichroic coating. End reflector 24 made of dichroic coating passes the pump wavelength band but reflects the signal wavelength band. Alternatively, the pump light can be introduced into Er-doped fiber through I/O port 20.

As with the previous embodiment discussed in reference to FIG. 3, a standing wave is generated, inducing a gain grating with gain saturation at the intensity maxima of input signal wave 28. The degree of gain saturation depends on the field intensity, leading to a desirable AGC effect. Because each wavelength channel has its own set of locations for intensity maxima, there is an independent AGC effect for each channel, leading to the desired equalization.

Figure 7:
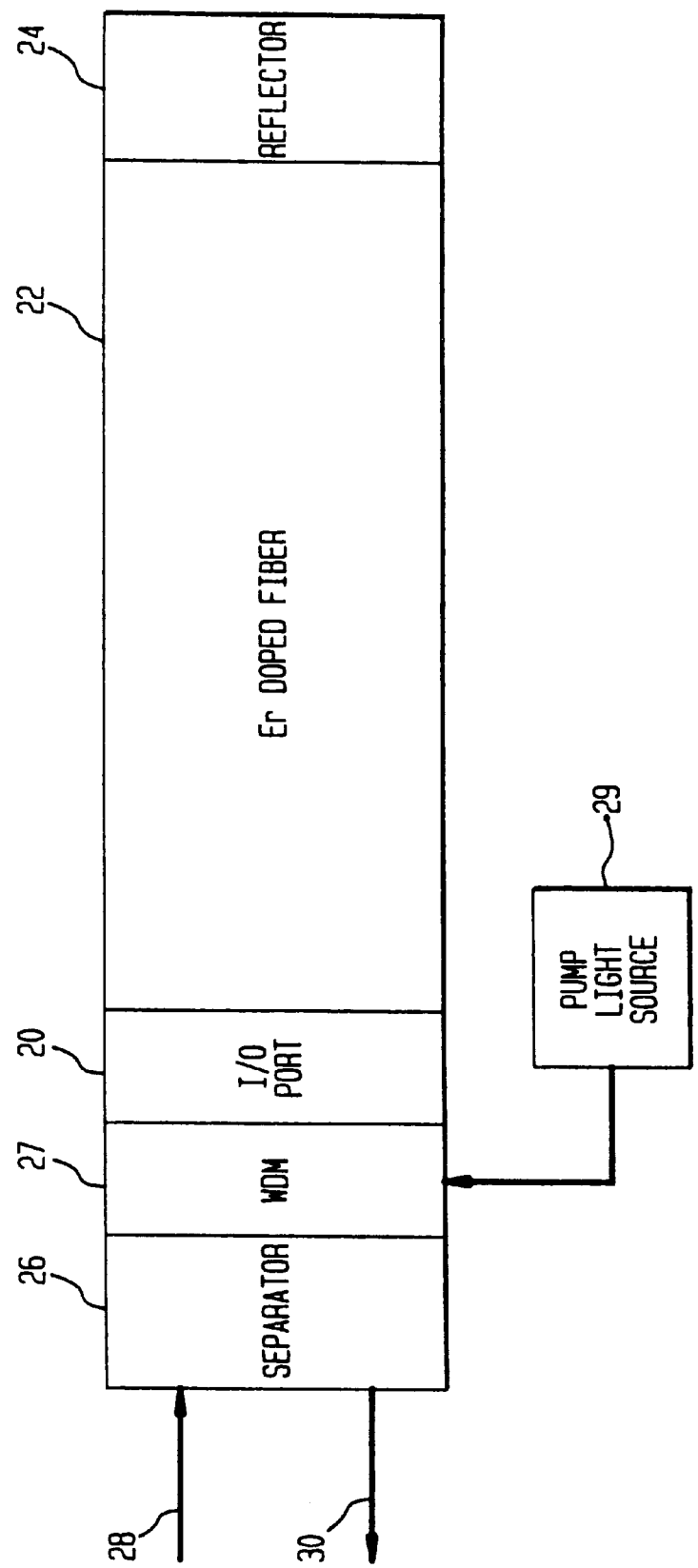
FIG. 7 is a block diagram in accordance with an embodiment of the present invention.

FIG. 7 is a block diagram in accordance with another embodiment of the present invention. The embodiment shown in FIG. 7 is similar to that shown in FIG. 6, but inserts wavelength division multiplexer (WDM) 27 between separator 26 and input/output port 20 to introduce pump light into the saturable absorber. Alternatively, WDM 27 can be placed before separator 26.

Figure 8:
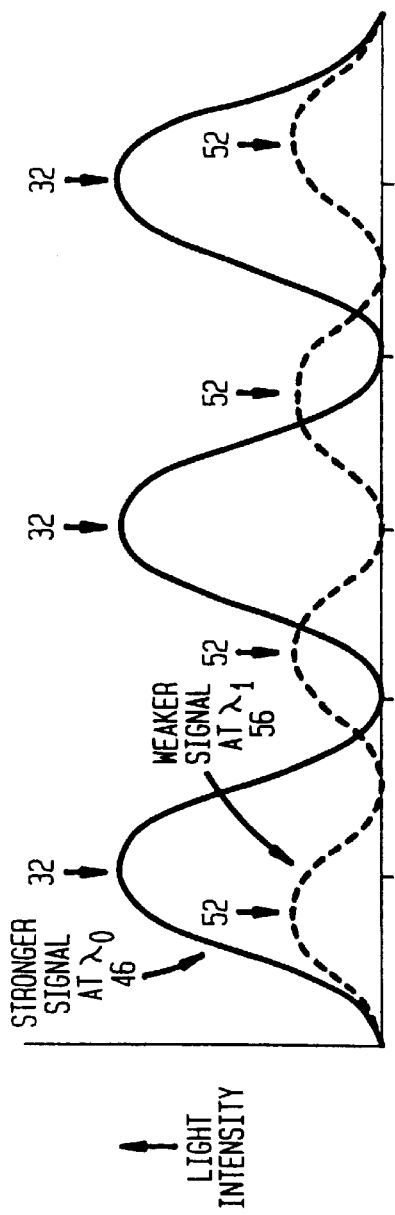
FIG. 8 is a light intensity versus position plotting when a multiwavelength optical signal comprising two unequal channels is present in accordance with an embodiment of the present invention.

FIG. 8 is a light intensity versus position plotting when a multiwavelength optical signal comprising two unequal channels is present in accordance with a channel equalization embodiment of the present invention. The plotting shows a stronger channel 46 of wavelength $\lambda 0$ and a weaker channel 56 of wavelength $\lambda 1$. The position of stronger channel 46 and weaker channel 56 is measured in terms of wavelengths ($\lambda 0$) from the reflector which is represented by the right axis, with the axis points labeled as $\lambda 0/4$, $3\lambda 0/4$ and $5\lambda 0/4$.

Figure 9:
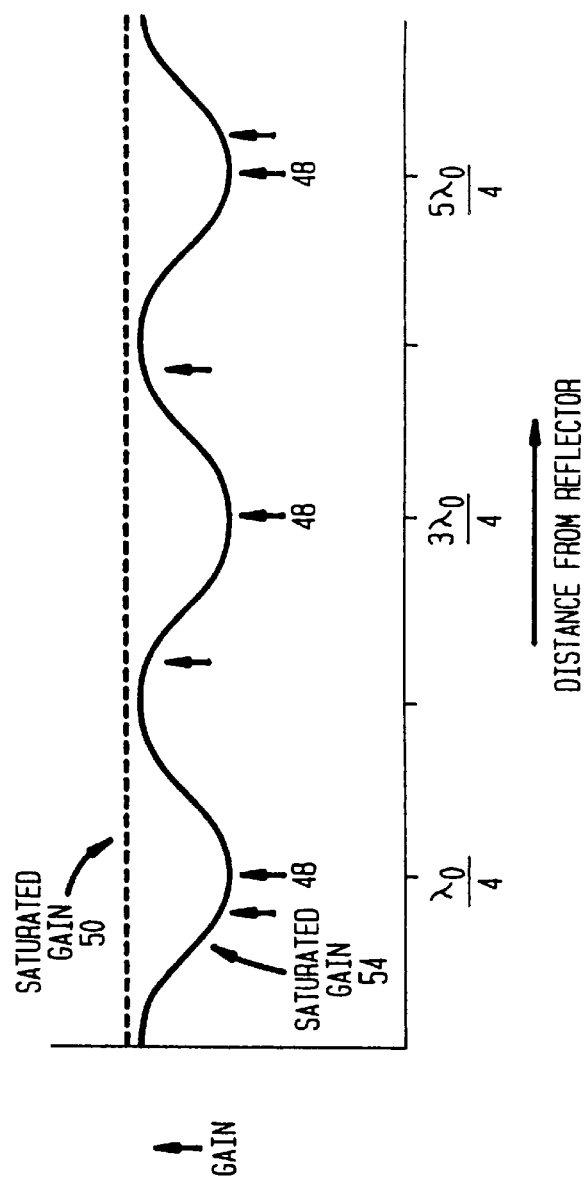
FIG. 9 is a gain versus position plotting showing the creation of a gain grating according to an embodiment of the present invention.

FIG. 9 is a gain versus position plotting showing the creation of a gain grating according to a channel equalization embodiment of the present invention.

Together, FIGS. 8 and 9 illustrate the mechanism of automatic, multichannel gain equalization in an embodiment of the present invention. The intensity maxima 32 of the standing wave associated with the stronger channel 46 are high enough to cause saturation of the gain medium, resulting in the creation of gain grating 54. The gain minima 48 substantially coincide with the intensity maxima 32, assuring that the stronger channel 46 will experience reduced gain, compared to the unsaturated gain 50. The intensity maxima 52 of the standing wave associated with the weaker channel 56 are not strong enough to cause significant gain saturation, and they do not generally coincide with gain minima 48. Therefore, over many periods of the gain grating, the weaker channel 56 will experience higher gain than the stronger channel 46, and partial gain equalization is accomplished. In a complete communication system, this partial equalization may be repeated over many stages to achieve the desired degree of gain equalization.

CONCLUSION

Although several embodiments are specifically illustrated and described herein, it will be appreciated that modifications and variations of the present invention are covered by the above teachings and within the purview of the appended claims without departing from the spirit and intended scope of the invention.

This specification describes the action of the self-tuning filter based on the principle of induced loss gratings in a saturable absorber. In brief, an optical signal is sent into a length L of fiber containing a saturable absorber in the core, reflected back on itself to create a standing wave, then output from the same port at which it entered. If the standing wave is strong enough to saturate the absorption, a loss grating will be induced which will attenuate noise signals at other wavelengths. The method presumes that the spectral density at the signal wavelength is much stronger than the spectral density at the noise wavelengths. For simplicity, consider the case of a strong, single-frequency pump wave and a weak, single-frequency probe wave.

PART I—INDUCED LOSS GRATING and PUMP ABSORPTION

The intensity of the pump wave and the loss profile in the fiber interact, and so they must be computed selfconsistently. The I/O port is assumed to be located at x=L and the reflector is assumed to be boated at x=0. Consider first the reflected wave. Its amplitude is:

$$A_R(x) = A_0 \cdot \sqrt{F(x)} \cdot \exp\left[i \cdot \omega \cdot \left(t - \frac{x}{v}\right) + i\phi\right]$$

The constant $A_0$ is the amplitude at x=0, the constants $\phi$ is the phase shift associated with the reflector, and the function $F(x)$ describes the reduction in intensity or power when propagating from location 0 to location x. It should be noted for future use that this $F(x)$ depends on the spatial frequency and phase of the standing wave relative to the loss grating; it is not the some as the loss experienced by a single traveling wave. Assuming that the reflector is 100% reflective, the incident wave is then:

$$A_I(x) = A_0 \cdot (F(x))^{-\frac{1}{2}} \cdot \exp\left[i \cdot \omega \cdot \left(t + \frac{x}{v}\right)\right]$$

the intensity at location x is made up of the incident and reflected waves $$I(x) = (|A_I(x) + A_R(x)|)^2$$

$$I(x) = (|A_I(x)|)^2 + (|A_R(x)|)^2 + A_0^2 \cdot \exp\left[i \cdot \left(2 \cdot \omega \cdot \frac{x}{v} - \phi\right)\right] + A_0^2 \cdot \exp\left[-i \cdot \left(2 \cdot \omega \cdot \frac{x}{v} - \phi\right)\right]$$

$$I(x) = A_0^2 \cdot \left(\frac{1}{F(x)} + F(x) + 2 \cdot \cos\left(2 \cdot \omega \cdot \frac{x}{v} - \phi\right)\right)$$

Note that the intensity function is a cosine wave of CONSTANT magnitude and period $xv/\omega$ superimposed on a DC background which increases away from the reflector. Since $F(x)$ must decrease monotonically from its value of 1 at x=0, we see that the modulation depth of the intensity wave is 100% at x=0 and decreases from there.

In a saturable absorber characterized by saturation intensity $I_S$, the intensity standing wave will generate an absorption standing wave with the same spatial frequency and phase, according to $$\alpha(x) = \frac{\alpha_0}{\left(1 + \frac{I(x)}{I_s}\right)}$$

At any point, the power absorption per unit length will be:

$$\Delta(x) = I(x) \cdot \alpha(x)$$

Assuming that I(x) changes slowly, over many spatial periods, we can average this loss over one period to eliminate the periodic dependences.

$$\Delta_{av}(x) = \frac{\omega}{v \cdot \pi} \cdot \int_x^{x + \pi \cdot \frac{v}{\omega}} \alpha(x') \cdot I(x') dx'$$

$$\Delta_{av}(x) = \frac{\omega}{v \cdot \pi} \cdot \alpha_0 \cdot$$

-continued $$\int_0^{\pi \cdot \frac{v}{\omega}} \frac{A_0^2 \cdot \left(\frac{1}{F(x)} + F(x) + 2 \cdot \cos\left(2 \cdot \omega \cdot \frac{x'}{v} - \phi\right)\right)}{\left[1 + \frac{A_0^2 \cdot \left(\frac{1}{F(x)} + F(x) + 2 \cdot \cos\left(2 \cdot \omega \cdot \frac{x'}{v} - \phi\right)\right)}{I_s}\right]} dx'$$

$$\Delta_{av}(x) = \frac{\alpha_0}{2 \cdot \pi} \cdot I_s \cdot \int_0^{2 \cdot \pi} \frac{I_0 + I_1 \cdot \cos(\zeta)}{I_s + I_0 + I_1 \cdot \cos(\zeta)} d\zeta$$

where we have defined $$\zeta = 2 \cdot \omega \cdot \frac{x'}{v} - \phi \qquad I_0 = A_0^2 \cdot \left(\frac{1}{F(x)} + F(x)\right) \qquad I_1 = 2 \cdot A_0^2$$

Continue to reduce integral $$\Delta_{av}(x) = \frac{\alpha_0}{2 \cdot \pi} \cdot I_s \cdot \int_0^{2 \cdot \pi} \left(1 - \frac{I_s}{I_s + I_0 + I_1 \cdot \cos(\zeta)}\right) d\zeta$$

$$\beta = \frac{I_s}{I_0 + I_s} \qquad \gamma = \frac{I_1}{I_0 + I_s}$$

$$\Delta_{av}(x) = \frac{\alpha_0}{2 \cdot \pi} \cdot I_s \cdot \left(2 \cdot \pi - 2 \cdot \beta \cdot \int_0^\pi \frac{1}{1 + \gamma \cdot \cos(\zeta)} d\zeta\right)$$

Obtain result from Table of Integrals, Series, and Products, I. S. Gradshteyn and I. M. Ryzhik, Academic Press, New York, 1965, sec. 2.553 #3.

$$\int_0^\pi \frac{1}{1 + \gamma \cdot \cos(\zeta)} d\zeta = \frac{2}{\sqrt{1 - \gamma^2}} \cdot \left(\arctan\left(\frac{\sqrt{1 - \gamma^2}}{1 + \gamma} \cdot \tan\left(\frac{\pi}{2}\right)\right) - \arctan\left(\frac{\sqrt{1 - \gamma^2}}{1 + \gamma} \cdot \tan(0)\right)\right)$$

$$\int_0^\pi \frac{1}{1 + \gamma \cdot \cos(\zeta)} d\zeta = \frac{\pi}{\sqrt{1 - \gamma^2}}$$

(for $\gamma < 1$; checked by numerical example)

Then we have:

$$\Delta_{av}(x) = \alpha_0 \cdot I_s \cdot \left(1 - \frac{\beta}{\sqrt{1 - \gamma^2}}\right)$$

Substituting in for $\beta$ and $\gamma$, we find:

$$\Delta_{av}(x) = \alpha_0 \cdot I_s \cdot \left[1 - \sqrt{\frac{I_s^2}{[(I_0 + I_s)^2 - I_1^2]}}\right]$$

$$\Delta_{av}(x) = \alpha_0 \cdot I_s \cdot \left[1 - \sqrt{\frac{I_s^2}{[I_0(x) + (I_s + I_1)] \cdot [I_0(x) + (I_s - I_1)]}}\right]$$

$$\Delta_{av}(x) = \alpha_0 \cdot I_s \cdot \left[1 - \frac{I_s}{\sqrt{\left[A_0^2 \cdot \left(\frac{1}{F(x)} + F(x)\right) + I_s\right]^2 - 4 \cdot A_0^4}}\right]$$

$$\Delta_{av}(x) = \alpha_0 \cdot I_s \cdot \left[1 - \frac{1}{\sqrt{\left[K \cdot \left(\frac{1}{F(x)} + F(x)\right) + 1\right]^2 - 4 \cdot K^2}}\right]$$

-continued $$K = \frac{A_0^2}{I_s}$$

The absorbed power will be drawn from the incident and reflected waves according to their relative intensities:

$$\Delta_I(x) = \frac{I_I}{I_I + I_R} \cdot \Delta_{av}(x) \qquad \Delta_R(x) = \frac{I_R}{I_I + I_R} \cdot \Delta_{av}(x)$$

$$\Delta_I(x) = \frac{\Delta_{av}(x)}{1 + F(x)^2} \qquad \Delta_R(x) = \Delta_{av}(x) \cdot \frac{F(x)^2}{1 + F(x)^2}$$

But we also know, by the definition of F(x), that the loss from the reflected wave between 0 and x is:

$$A_0^2 \cdot (1 - F(x))$$

so we have the integral equation which determines F(x).

$$A_0^2 \cdot (1 - F(x)) = \int_0^x \Delta_R(x') dx'$$

This can be differentiated to yield the non-linear differential equation:

$$\frac{d}{dx} F(x) = -\frac{1}{A_0^2} \cdot \Delta_R(x) \square$$

Try expanding in powers of K for a weak saturation result $$\Delta_R(x) = \alpha_0 \cdot I_s \cdot \left[ 1 - \frac{1}{\sqrt{\left[K \cdot \left(\frac{1}{F(x)} + F(x)\right) + 1\right]^2 - 4 \cdot K^2}} \right] \cdot \frac{(F(x))^2}{(1 + (F(x))^2)} \square$$

$$\Delta_R(x) = \alpha_0 \cdot I_s \cdot \left[ F(x) \cdot K - \left[1 + (F(x))^2 + 2 \cdot \frac{(F(x))^2}{(1 + (F(x))^2)}\right] \cdot K^2 + O(K^3) \right] \square$$

As K goes to 0, this becomes $$\Delta_R(x) = \alpha_0 \cdot A_0^2 \cdot F(x) \square$$

Then the differential equation becomes $$\frac{d}{dx} F(x) = -\alpha_0 \cdot F(x) \square$$

which is clearly the correct result when there is no saturation of the absorption. In the limit of large K (strong saturation of absorption), the equation is:

$$\frac{d}{dx} F(x) = -\frac{\alpha_0 \cdot I_s}{A_0^2} \cdot \frac{(F(x))^2}{(1 + (F(x))^2)} \square$$

Figure 10A:
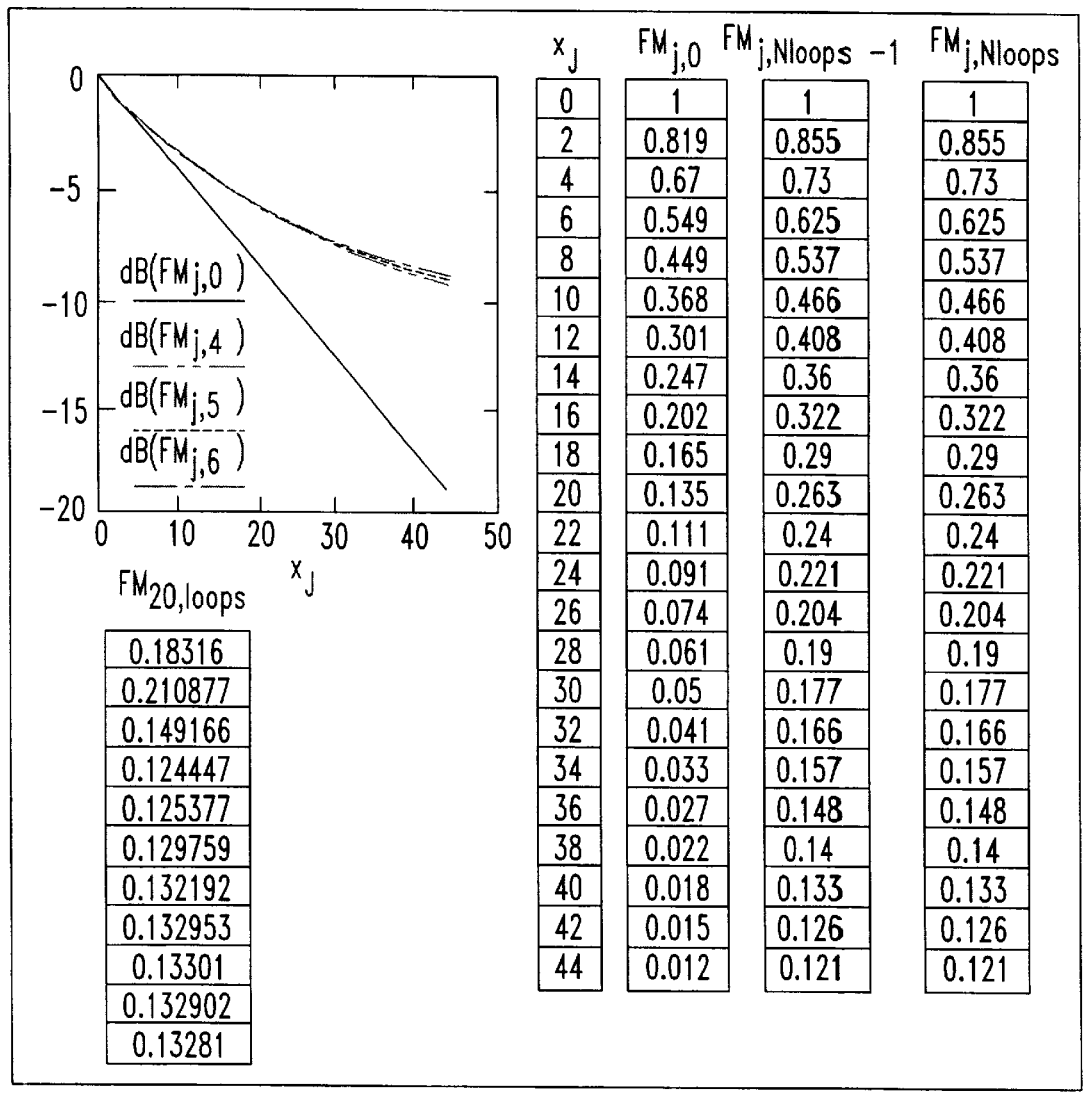
FIG. 10A is a plot of $X_j$ versus $dB(FM_{j-x})$.
Figure 10B:
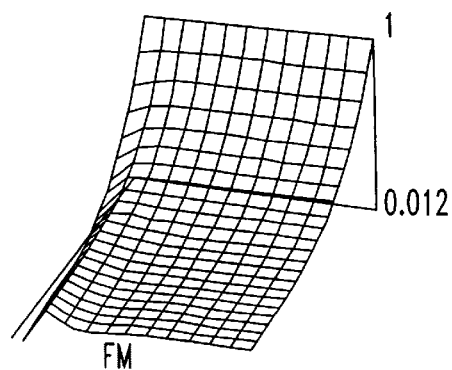
FIG. 10B is a three dimensional plot of FM from 0.012 to 1.

FIG. 10A is a plot of $X_j$ versus $dB(FM_{j,x})$. FIG. 10B is a three dimensional plot of FM from 0.012 to 1. Together, FIG. 10A and FIG. 10B illustrate an iterative solution that can be achieved for an arbitrary K. Taking K=5 as a specific example $$\alpha_0 := 1 \text{ in } m^{-1} \qquad A_0 := 1 \quad \text{actually, a dummy variable}$$

-continued $$K := 5$$

$$\Delta_R(F) := \alpha_0 \cdot \frac{A_0^2}{K} \cdot \left[ 1 - \frac{1}{\sqrt{\left[K \cdot \left(\frac{1}{F} + F\right) + 1\right]^2 - 4 \cdot K^2}} \right] \cdot \frac{F^2}{(1 + F^2)}$$

$$Npoints := 22 \qquad Nloops := 10 \qquad \text{x\_step} := 2$$

$$j := 0 \ldots Npoints \qquad x_j := \text{x\_step} \cdot j + 0 \qquad TOL := 10^{-5}$$

$$loop := 0 \ldots Nloops$$

$$FM_{j,0} := \exp\left(\frac{-\alpha_0 \cdot x_j}{10}\right) \qquad \text{starting guess for } F(x)$$
$$\text{use lin interp of table for speed}$$

$$FM_{j,loop+1} := \frac{1}{2} \cdot \left[ \left( 1 - \frac{1}{A_0^2} \cdot \int_0^{x_j} \Delta_R(\text{linterp}(x, FM^{\langle loop \rangle}, x')) dx' \right) + FM_{j,loop} \right]$$

$$dB(r) := 10 \cdot \log(r) \qquad \lin(dB) := 10^{\left(\frac{dB}{10}\right)}$$

PART II. ABSORPTION OF WEAK PROBE WAVE

The self-consistent calculation above gives the intensity of the pump beam and the degree of local absorption along the fiber. Thus the absorption of a weak probe beam can be calculated. As noted above, the power absorption per unit length at any point will be:

$$\Delta_{PR}(x) = I_{PR}(x) \cdot \alpha(x)$$

As for the pump beam, the probe beam intensity has the form:

$$I_{pr}(x) = A_{pr}^2 \cdot \left( \frac{1}{F_{pr}(x)} + F_{pr}(x) + 2 \cdot \cos\left(2 \cdot \omega_{pr} \cdot \frac{x}{v} - \phi\right) \right) \square$$

For convenience, assume that the velocity and the reflector phase are the same for the two waves. The local absorpton is periodic with the spatial period of the pump standing wave, so it can be expressed as a Fourier series, leading to:

$$\Delta_{pr}(x) = I_{pr}(x) \cdot \sum_m C_m \cdot \cos\left(2 \cdot m \cdot \omega \cdot \frac{x}{v}\right) + D_m \cdot \sin\left(2 \cdot m \cdot \omega \cdot \frac{x}{v}\right)$$

making the usual assumptions about slow variation of all quantities relative to the optical frequency, it is clear that the integral over macroscopic x will be non-zero only if $$\omega_{pr} = m \cdot \omega$$

Since the useful wavelength band is much less than an octave, this will not occur, and only the DC terms will contribute significant absorption of the probe wave. Now $$\alpha(x) = \frac{\alpha_0}{1 + K \cdot \left( \frac{1}{F} + F + 2 \cdot \cos\left(2 \cdot \omega \cdot \frac{x}{v} - \phi\right) \right)}$$

$$\alpha(x) = \frac{\Gamma}{1 + \Lambda \cdot \cos(\zeta)}$$

where $$\Gamma = \frac{\alpha_0 \cdot F}{F + K \cdot (1 + F^2)} \qquad \Lambda = \frac{2 \cdot K \cdot F}{F + K \cdot (1 + F^2)}$$

Then the DC part of $\alpha(x)$ is:

$$C_0 = \frac{\Gamma}{2 \cdot \pi} \cdot \int_0^{2\pi} \frac{1}{1 + \Lambda \cdot \cos(\zeta)} d\zeta$$

$$C_0 = \frac{\Gamma}{\sqrt{1 - \Lambda^2}}$$

$$C_0 = \alpha_0 \cdot \frac{F}{\sqrt{(F + K \cdot (1 + F^2))^2 - 4 \cdot K^2 \cdot F^2}}$$

Thus for the limit of small K $$C_0 = \alpha_0$$

and for the limit of large K $$C_0 = \alpha_0 \cdot \frac{F}{K \cdot (1 - F^2)}$$

returning to the general form and restoring the slow x dependence, we find the probe absorption per unit length:

$$\Delta_{pr}(x) = A_{pr}^2 \cdot \left( \frac{1}{F_{pr}(x)} + F_{pr}(x) \right) \cdot \alpha_0 \cdot$$

$$\frac{F(x)}{\sqrt{(F(x) + K \cdot (1 + F(x)^2))^2 - 4 \cdot K^2 \cdot F(x)^2}}$$

Considering now only the reflected wave $$\Delta_{pr\_R}(x) = \Delta_{pr}(x) \cdot \frac{F_{pr}(x)^2}{1 + F_{pr}(x)^2}$$

$$\Delta_{pr\_R}(x) = \Delta_{pr} \cdot \frac{F_{pr}(x)^2}{1 + F_{pr}(x)^2}$$

$$\Delta_{pr\_R}(x) = A_{pr}^2 \cdot F_{pr}(x) \cdot \alpha_0 \cdot$$

$$\frac{F(x)}{\sqrt{(F(x) + K \cdot (1 + F(x)^2))^2 - 4 \cdot K^2 \cdot F(x)^2}}$$

Then normalize to the probe intensity to get an effective absorption coefficient:

$$\alpha_{pr\_eff}(x) = \alpha_0 \cdot \frac{F(x)}{\sqrt{(F(x) + K \cdot (1 + (F(x))^2))^2 - 4 \cdot K^2 \cdot (F(x))^2}}$$

For comparison, the equivalent quantity for the pump wave is:

$$\alpha_{eff} = \frac{\alpha_0}{K} \cdot \frac{F}{1 + F^2} \cdot \left[ 1 - \frac{F}{\sqrt{(K \cdot (1 + F^2) + F)^2 - 4 \cdot F^2 \cdot K^2}} \right]$$

Finally, integrate over $\alpha$ to find the the loss of the whole filter in decibels:

$$dBloss(x) = 10 \cdot \log\left( \exp\left( - \int_0^x \alpha_{pr\_eff}(x') dx' \right) \right)$$

$$dBloss(x) = 10 \cdot \log(\exp(1)) \cdot \left( - \int_0^x \alpha_{pr\_eff}(x') dx' \right)$$

$$dBloss(x) = -10 \cdot \log(\exp(1)) \cdot$$

$$\int_0^x \alpha_0 \cdot \frac{F(x')}{\sqrt{(F(x') + K \cdot (1 + F(x')^2))^2 - 4 \cdot K^2 \cdot F(x')^2}} dx'$$

Substitute in the tabular form of $F(x)$ that was calculated above:

$$F'(\xi) := \text{linterp}(x.FM^{<\text{Nloops}>}, \xi)$$

$$(dBloss)_j := -10 \cdot \log(\exp(1)) \cdot \int_0^{x_j} \alpha_0 \cdot \frac{F'(x')}{\sqrt{(F'(x') + K \cdot (1 + F'(x')^2))^2 - 4 \cdot K^2 \cdot F'(x')^2}} dx'$$

$$(dBloss)_j := -10 \cdot \log(\exp(1)) \cdot \int_0^{x_j} \alpha_0 dx' \qquad \begin{array}{l} dB(\exp(-1)) = -4.343 \\ \alpha_0 = 1 \end{array}$$

$$\text{ins\_loss} := 2 \cdot \overrightarrow{dB(FM^{<\text{Nloops}>})}$$

$$\text{rejection} := 2 \cdot \overrightarrow{(dB(FM^{<\text{Nloops}>}) - dBloss)}$$

-continued $$m := 0\ldots4 \quad LL := \begin{bmatrix} 1 \\ 3 \\ 6 \\ 12 \\ 18 \end{bmatrix}$$

$y := 1 \qquad TOL := 10^{-8}$ $L_m := root(linterp(x,ins\_loss,y) + LL_m,y)$
$\alpha_0 \cdot L_m \qquad linterp(x,rejection,L_m)$

| $\alpha_0 \cdot L_m$ | $linterp(x,rejection,L_m)$ |
|---|---|
| 1.467 | 1.727 |
| 4.397 | 4.604 |
| 8.975 | 7.096 |
| $2.101 \cdot 10$ | 8.832 |
| $4.216 \cdot 10$ | 9.246 |

| $dBloss_j$ | $x_j$ | $ins\_loss_j$ | $rejection_j$ |
|---|---|---|---|
| 0 | 0 | 0 | 0 |
| −1.858 | 2 | −1.363 | 2.353 |
| −3.524 | 4 | −2.731 | 4.317 |
| −4.923 | 6 | −4.085 | 5.762 |
| −6.079 | 8 | −5.395 | 6.763 |
| −7.041 | 10 | −6.636 | 7.447 |
| −7.855 | 12 | −7.793 | 7.917 |
| −8.555 | 14 | −8.864 | 8.245 |
| −9.167 | 16 | −9.853 | 8.481 |
| −9.709 | 18 | $−1.076 \cdot 10$ | 8.653 |
| $−1.019 \cdot 10$ | 20 | $−1.161 \cdot 10$ | 8.782 |
| $−1.063 \cdot 10$ | 22 | $−1.239 \cdot 10$ | 8.881 |
| $−1.104 \cdot 10$ | 24 | $−1.311 \cdot 10$ | 8.958 |
| $−1.14 \cdot 10$ | 26 | $−1.379 \cdot 10$ | 9.02 |
| $−1.175 \cdot 10$ | 28 | $−1.442 \cdot 10$ | 9.069 |
| $−1.206 \cdot 10$ | 30 | $−1.502 \cdot 10$ | 9.11 |
| $−1.236 \cdot 10$ | 32 | $−1.558 \cdot 10$ | 9.143 |
| $−1.264 \cdot 10$ | 34 | $−1.611 \cdot 10$ | 9.171 |
| $−1.29 \cdot 10$ | 36 | $−1.661 \cdot 10$ | 9.194 |
| $−1.315 \cdot 10$ | 38 | $−1.708 \cdot 10$ | 9.214 |
| $−1.338 \cdot 10$ | 40 | $−1.754 \cdot 10$ | 9.231 |
| $−1.361 \cdot 10$ | 42 | $−1.797 \cdot 10$ | 9.245 |
| $−1.382 \cdot 10$ | 44 | $−1.838 \cdot 10$ | 9.257 |

Figure 11:
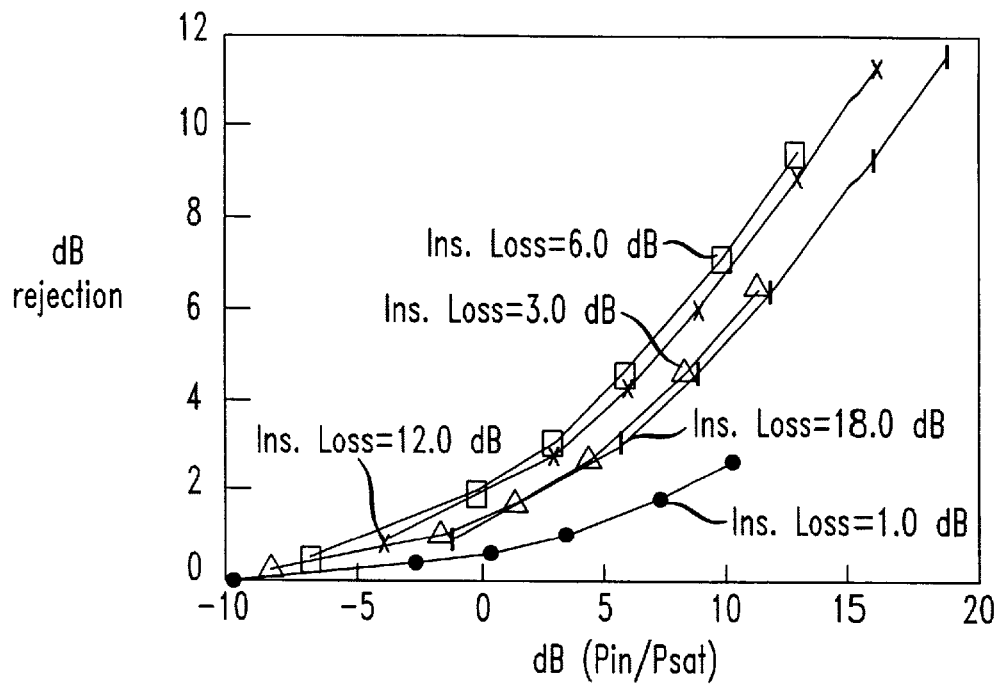
FIG. 11 is a plot of dB (Pin/Psat) versus dB resction.
Figure 12:
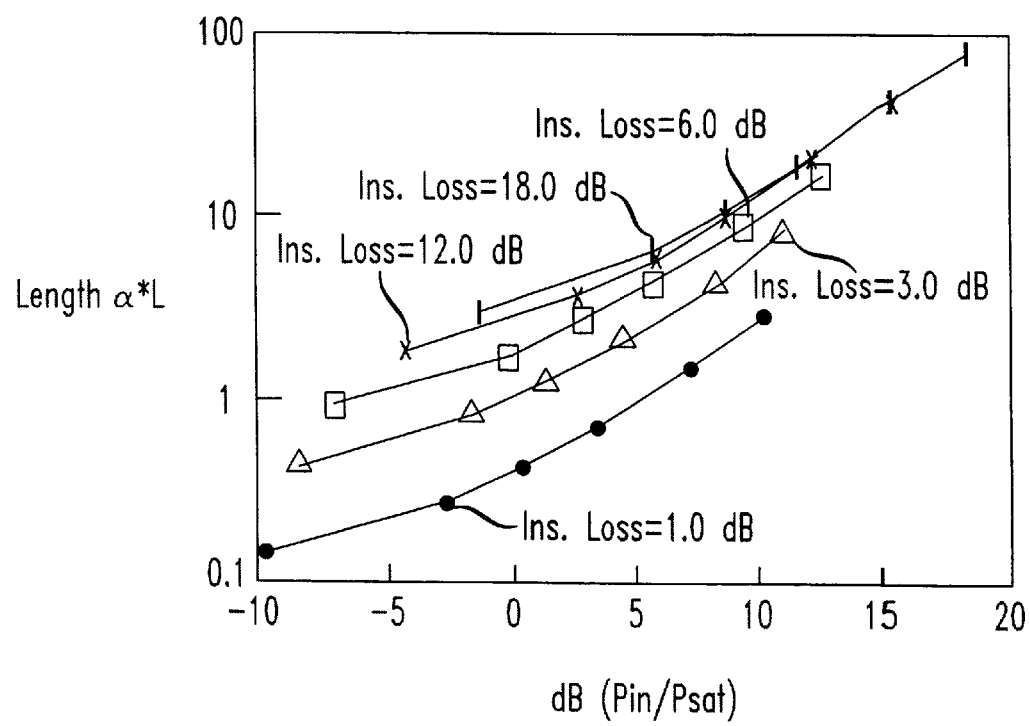
FIG. 12 is a plot of dB (Pin/Psat) versus Length $\alpha$ *L.

Repeating the above calculation for various values of K, plots of noise rejection and required filter length can be made as a function of normalized input power, with insertion loss as a parameter. These plots are illustrated in FIGS. 11 and 12, respectively.

What is claimed is:

1. An apparatus for optical signal processing, comprising:
   a single-mode guided wave structure including a saturable medium, said structure having a first and second end;
   a reflector at said first end of said structure; and
   an input/output port at said second end of said structure such that light entering said input/output port interferes with light reflected off said reflector to create an induced interference grating.

2. The apparatus as defined in claim 1, wherein said guided wave structure contains rare earth dopants.

3. The apparatus as defined in claim 1, wherein said saturable medium is a semiconductor medium.

4. The apparatus as defined in claim 1, wherein said guided wave structure is an optical fiber.

5. The apparatus as defined in claim 1, wherein said guided wave structure is a planar optical waveguide.

6. The apparatus as defined in claim 1, wherein said reflector is a metallic mirror.

7. The apparatus as defined in claim 1, wherein said reflector has a dielectric coating.

8. The apparatus as defined in claim 1, wherein said interference induced grating is a loss grating.

9. The apparatus as defined in claim 1, further comprising a separator for separating said light to and from said input/output port.

10. The apparatus as defined in claim 9, wherein said separator is a directional coupler.

11. The apparatus as defined in claim 9, wherein said separator is a circulator.

12. The apparatus as defined in claim 1, further comprising a source of pump light and a means for introducing said pump light into said saturable medium to create optical gain.

13. The apparatus as defined in claim 12, wherein said interference induced grating is a gain grating.

14. The apparatus as defined in claim 12, wherein said means for introducing pump light is provided by using a dichroic reflector.

15. The apparatus as defined in claim 12, wherein said means for introducing pump light is provided by a wavelength division multiplexer.

16. A self-tuning optical filter, comprising:
    a single-mode guided wave structure including a saturable gain medium, said structure having a first and second end;
    a reflector at said first end of said structure; and
    an input/output port at said second end of said structure such that light entering said input/output port interferes with light reflected off said reflector to create a standing wave with local intensity maxima, wherein said standing wave induces a loss grating with areas of low absorption coincident with said intensity maxima.

17. The self-tuning optical filter defined in claim 16, further comprising a separator for separating said incoming optical signal from said reflected signal at said end of said guided wave structure.

18. The self-tuning optical filter defined in claim 17, wherein said separator is a directional coupler.

19. The self-tuning optical filter defined in claim 17, wherein said separator is a circulator.

20. The self-tuning optical filter defined in claim 16, wherein said loss grating automatically adjusts to match the number of optical wavelength channels and the wavelength of each channel included in said optical signal.

21. A method for filtering noise from an optical signal made up of at least one discrete wavelength of light, comprising the steps of:
    introducing an incoming optical signal into one end of a single-mode guided wave structure having a saturable absorber; and
    reflecting said incoming optical signal wave back onto itself to create a standing wave with local intensity maxima, wherein said standing wave induces a loss grating with areas of low absorption coincident with said intensity maxima.

22. The method for filtering noise defined in claim 21, further comprising the step of separating said incoming optical signal from said reflected signal at said end of said guided wave structure.

23. The method described in claim 21, wherein said loss grating automatically adjusts to match the number of optical wavelength channels and the wavelength of each channel included in said optical signal.

24. A method for automatically adjusting an optical noise filter to match the number of optical wavelength channels and the wavelength of each channel in an optical communication system, comprising the steps of:

passing an optical signal through a counter-propagating replica of said signal within a single-mode guided-wave structure to create a standing wave pattern of intensity maxima;

inducing a loss grating in a saturable absorber within said waveguide, such that regions of low loss coincide with said intensity maxima of said standing wave; and extracting said replica as the filtered output signal.

25. An automatic channel equalizer for use in a multi-wavelength lightwave communications system, comprising:

a single-mode guided wave structure including a saturable gain medium, said structure having a first and second end;

a reflector at said first end of said structure;

a light source for pumping light into said medium to produce gain; and an input/output port at said second end of said structure such that light entering said input/output port interferes with light reflected off said reflector to create a standing wave with local intensity maxima, wherein said standing wave induces a gain grating with areas of reduced gain coincident with said intensity maxima.

26. The automatic channel equalizer defined in claim 25, further comprising a separator for separating said incoming optical signal from said reflected signal at said end of said guided wave structure.

27. The automatic channel equalizer defined in claim 26, wherein said separator is a directional coupler.

28. The automatic channel equalizer defined in claim 26, wherein said separator is a circulator.

29. A method for automatic gain control of a multi-wavelength lightwave communications system, comprising the steps of:

introducing an incoming optical signal into one end of a single-mode guided wave structure having a saturable gain medium;

introducing additional pump light into said medium to produce gain; and reflecting said incoming signal back onto itself to create a standing wave with local intensity maxima, wherein said standing wave induces a gain grating with areas of reduced gain coincident with said intensity maxima.

30. A method for automatic gain control defined in claim 29, further comprising the step of separating said incoming optical signal from said reflected signal at said end of said guided wave structure.

31. A method for creating an interference induced grating within a single-mode guided wave structure, comprising the steps of:

introducing a saturable medium within the guided wave structure; and causing the interaction of an optical signal with a reflection of said optical signal such that a standing wave pattern of intensity maxima exists within said medium, thereby forming said interference induced grating.

* * * * *